US005126732A

United States Patent [19]

Mardon

[11] Patent Number: 5,126,732

[45] Date of Patent: Jun. 30, 1992

[54] STORAGE SYSTEM WITH ADJACENT BINS CONTROLLED BY A MICROPROCESSOR DEVICE

[75] Inventor: Philippe Mardon, Combs la Ville, France

[73] Assignee: MORS, Paris, France

[21] Appl. No.: 555,830

[22] Filed: Jul. 23, 1990

Related U.S. Application Data

[63] Continuation of Ser. No. 272,402, Nov. 17, 1988, abandoned.

[30] Foreign Application Priority Data

Mar. 21, 1988 [FR] France ............................... 88 03629

[51] Int. Cl.[5] ............................................... H04B 1/00

[52] U.S. Cl. .......................... 340/825.35; 340/825.31; 364/464.01

[58] Field of Search .................. 70/277, 278; 194/218, 194/239, 247, 350; 200/DIG. 3; 221/154; 235/375, 382, 382.5, 385, 419; 340/825.3, 825.31, 825.33, 825.34, 825.35, 569, 570; 361/172; 364/464.01

[56] References Cited

U.S. PATENT DOCUMENTS

| | | | |
|---|---|---|---|
| 4,204,635 | 5/1980 | Hofmann et al. | 235/382 |
| 4,379,334 | 4/1983 | Feagins, Jr. et al. | 364/467 |
| 4,636,634 | 1/1987 | Harper et al. | 235/385 |
| 4,698,630 | 10/1987 | Ellsberg | 235/382 |
| 4,773,020 | 9/1988 | Anderson et al. | 364/464.01 |

FOREIGN PATENT DOCUMENTS

| | | | |
|---|---|---|---|
| 0006403 | 6/1978 | European Pat. Off. . | |
| 0065605 | 5/1981 | European Pat. Off. . | |
| 2700631 | 7/1978 | Fed. Rep. of Germany | 194/350 |
| 2922262 | 5/1979 | Fed. Rep. of Germany . | |
| 3328694 | 2/1985 | Fed. Rep. of Germany | 194/247 |
| 8501907 | 7/1985 | Netherlands . | |
| WO83/00578 | 2/1983 | PCT Int'l Appl. . | |
| 2078845 | 1/1982 | United Kingdom | 70/277 |
| 2205983 | 12/1988 | United Kingdom | 194/239 |

OTHER PUBLICATIONS

English Translation of EP 65065 by Canino et al.

*Primary Examiner*—Donald J. Yusko
*Assistant Examiner*—Dervis Magistre
*Attorney, Agent, or Firm*—Kenyon & Kenyon

[57] ABSTRACT

A stowing system with adjacent lockers comprising a microprocessor device connected to a display device and to a key-board enabling the user to compose a personal secret code transmitted to the microprocessor device which operates the locking of the lock of the door of the selected locker, this code being stored in a storage of the microprocessor device for the whole period of occupation of the selected locker.

7 Claims, 12 Drawing Sheets

STORAGE SYSTEM WITH ADJACENT BINS CONTROLLED BY A MICROPROCESSOR DEVICE

This application is a continuation of application Ser. No. 07/272,402, filed Nov. 17, 1988, now abandoned.

BACKGROUND OF THE PRESENT INVENTION

The present invention relates to a storage or tidying system with adjacent bins, lockers or like compartments each one closed by a door and enabling any user to deposit or lodge objects such as luggages or parcels or packets into a selected bin, locker or like compartment as well as to withdraw or remove these things at the end of a determined time period of occupation of the bin.

Systems operated by a microprocessor device which would lock the lock of the door of the selected bin containing the objects after payment of a determined sum or fee and would deliver or dispense a ticket on which is printed in particular a code number identifying the selected bin are known. Before the end of the allowed period of occupation of the bin, the user would compose by means of a key-board the code number which is recognized by the microprocessor device then controlling the unlocking of the lock of the door of the occupied bin or locker.

The delivery however of a ticket onto which the code of identification of the selected bin is printed in clear would be constraining for the user who has to store the ticket at a safe place enabling him to find or recover it for the withdrawal of the objects left in the locker. Moreover, the user may lose his ticket which may be found by persons likely to appropriate the objects left in the locker after having composed the code printed on the ticket.

SUMMARY OF THE PRESENT INVENTION

The present invention aims at removing the above inconveniences of the known systems by providing a storage system comprising a plurality of adjacent bins each one of which is closed by a door: a microprocessor device connected in particular through the agency of an input/output interface device to locks for opening and closing the doors of the bins or lockers, and to signal lights or lamps indicating the free or occupied condition of the bins or lockers, to keys for selecting free bins or lockers and to a coin-operated device; and characterized in that the microprocessor device is also connected to a display device initially indicating to a user the type of operation such as the depositing or withdrawal of an object he can make and to a key-board enabling the user to choose one of the two operations contemplated and when a depositing operation is requested or called for, after having deposited or lodged an object into a selected free bin or locker and has been inserted the required sum has been inserted into the coin-operated device, to compose a personal code transmitted to the microprocessor device which controls the locking of the lock of the door of the selected bin or locker. The personal code is stored or memorized in a storage of the microprocessor device for the whole duration of occupation of the selected bin or locker.

According to a feature of the invention, when desiring to withdraw the object from the occupied bin or locker, the key-board enables the user to enter his personal code which is compared to the code memorized or stored in the storage of the microprocessor device which, after having verified the coincidence of both codes, would operate the unlocking of the lock of the door of the occupied bin or locker.

According to another feature, the system comprises an opto-electronic sensor, pick-up or like detector associated with a lock of a door of a bin or locker and controlling the proper locking of the lock.

According to still a further feature of the invention, the keys for selecting the free bins or lockers and the key-board for composing personal codes forming together an alphanumeric key-board and each personal code composed by the user is preceded by a letter identifying the selected free bin or locker.

According to still another feature of the invention, the key-board also enables the working owner to compose the system of special secret codes conveyed to the microprocessor device allowing various particular functions such as the opening of at least one bin door, the withdrawal of the cash-box or till with visual display at the display device of the cashed amount, the opening of the technical module comprising the microprocessor device.

According to still a further feature of the invention, the microprocessor device is adapted to enable the working owner to change at least one of the aforesaid secret codes by means of the key-board.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and wherein.

DETAILED DESCRIPTION OF THE PRESENT INVENTION

Figure 1:
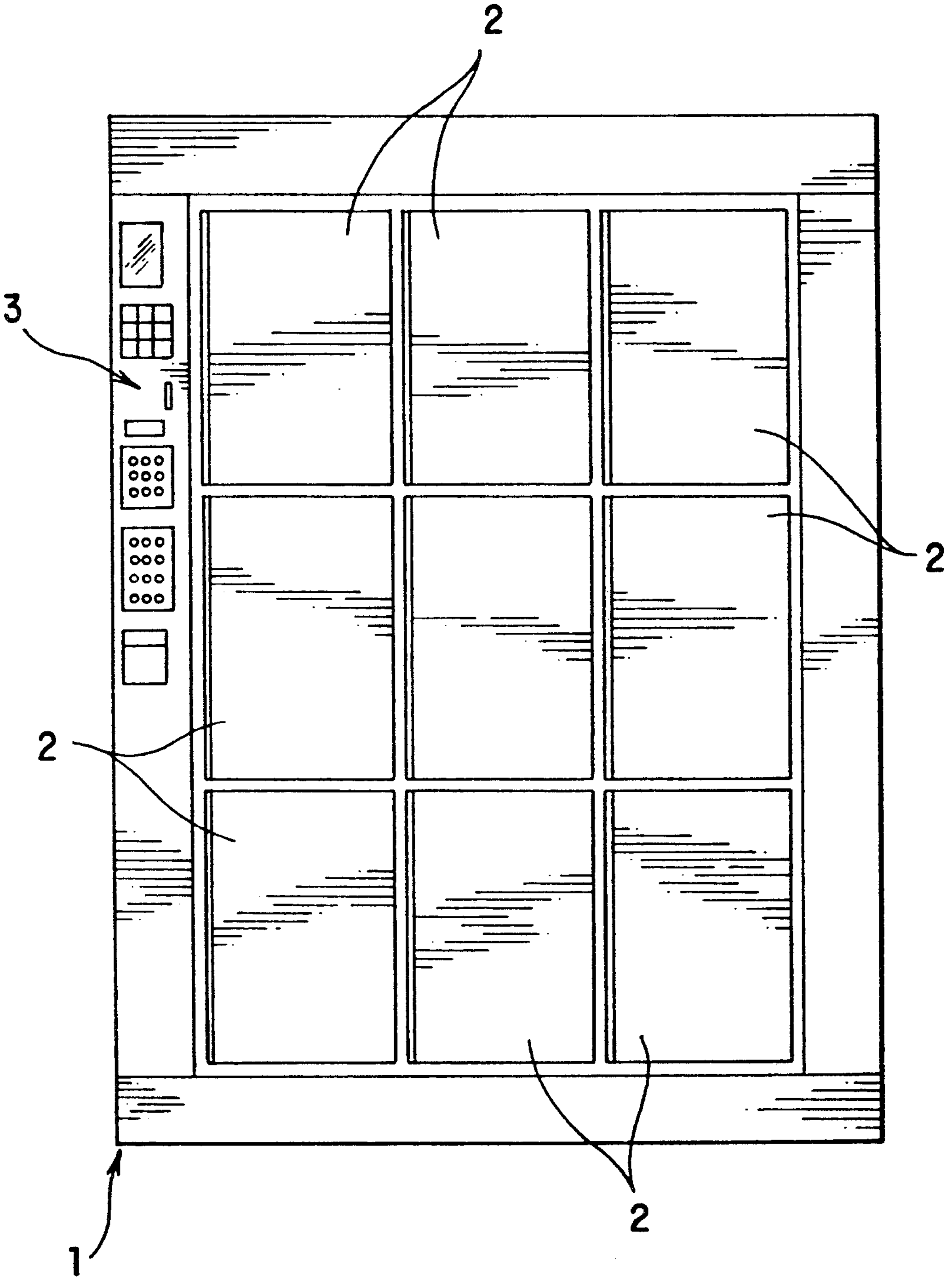
FIG. 1 is a front view of the stowing or storage system with adjacent bins or lockers according to the invention.
Figure 2:
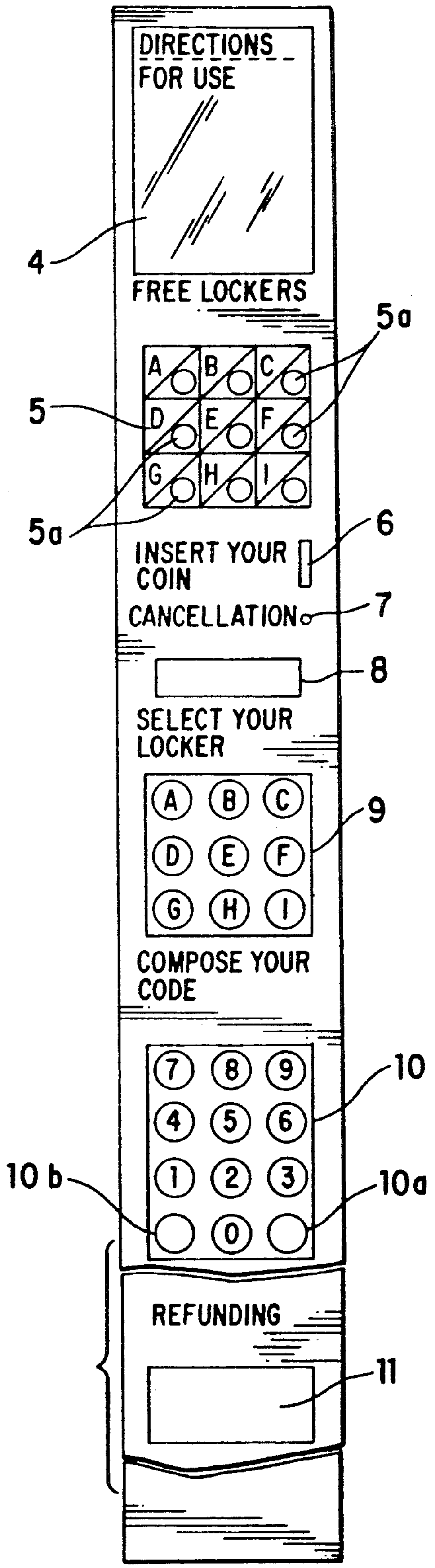
FIG. 2 is a front view of the technical module containing the microprocessor device managing or monitoring the stowing or storage lockers.
Figure 3:
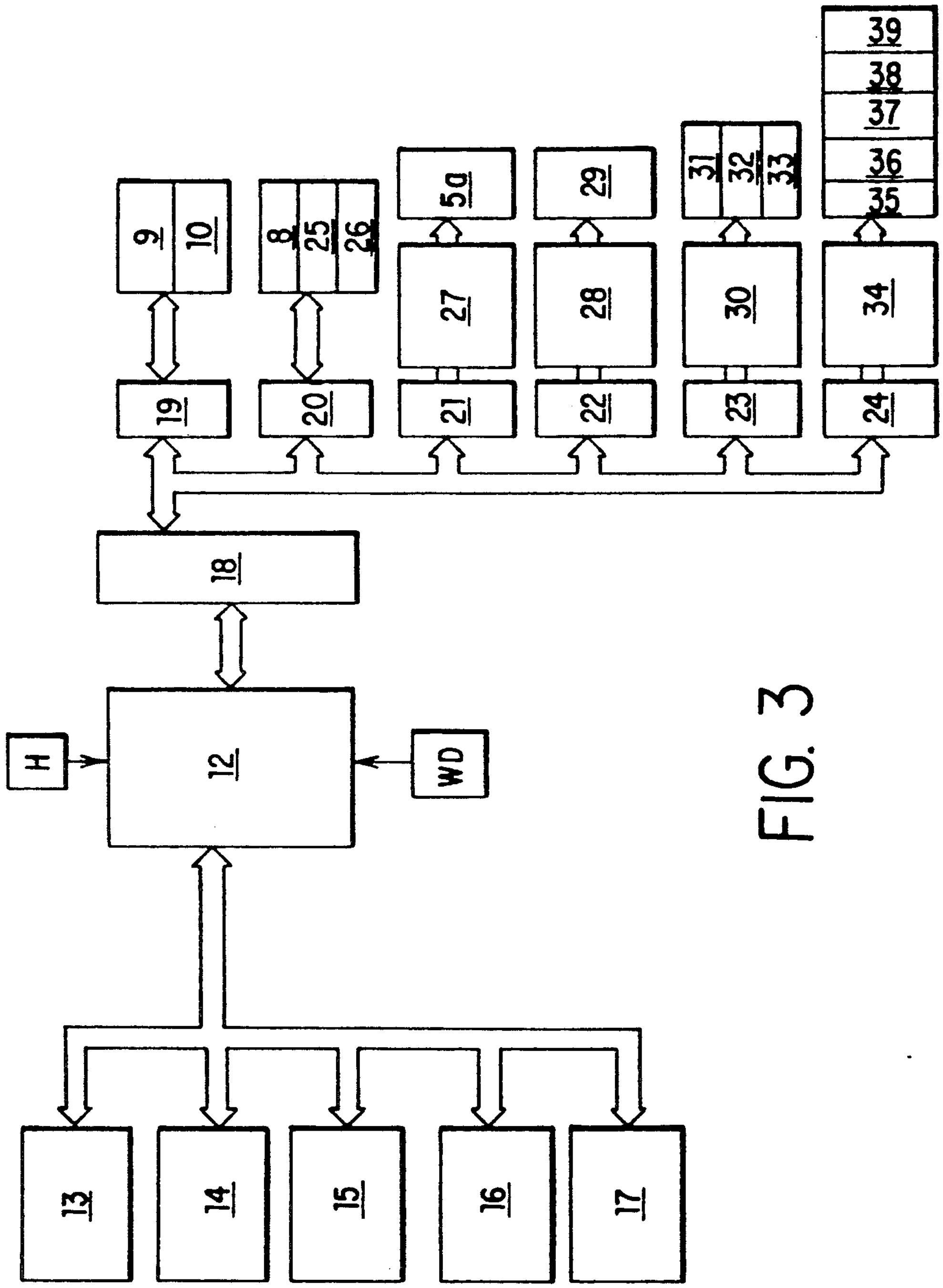
FIG. 3 diagrammatically shows the microprocessor device.

Referring to the drawings, the reference numeral 1 designates a stowing or storage system with adjacent bins or lockers 2 of which, in the illustrated embodiment there are nine, and the doors of which, in the closed position, are juxtaposed or arranged side by side to extend in a same front plane. Each door comprises a self-acting biasing device for automatically returning or moving the door back into the shut down closing position. Such drawback devices are already known per se and may for instance consist of a return spring arranged in coaxial relation to the door hinge and acting between the door and the door frame. Each door also includes a lock secured to the inside of the door, the locking and unlocking of which are controlled by a microprocessor device such as will be described hereinafter.

A technical module 3 is assembled to one portion of the frontage of the stowing or storage system externally of that occupied by the doors 2. As shown, the technical module 3 is arranged at the left-hand upright or standard of the stowing system and may be withdrawn or removed by the owner or maintainer of the system for instance in the case of a repair to be carried out within the module. The latter comprises from bottom to top and being visible or accessible from the outside, a small poster or bill 4 relating to the directions for use of the stowing system, a board 5 comprising letters for the identification of the bins or lockers 2, respectively, and signal lights or lamps 5*a*, for instance of the type with electroluminescent diodes (LED), associated with the letters for identifying the bins or lockers 2, respectively. Each signal light 5*a* indicates the free or occupied state of the corresponding locker, the free condition being shown for instance by a lit signal light (green light) whereas the occupied condition is shown by an extinguished light. Below the board 5 are successively arranged a slit 6 for inserting a coin and a cancelling button 7 allowing the refunding of the inserted coin. An alphanumeric display device 8 of the kind with liquid crystals (LCD) enables the user to converse with the stowing system with a view to properly accomplish the various operating steps to be performed for depositing or withdrawing objects to be left in the locker. An alphabetical key-board 9 enables the user to select the free bin or locker he wishes to use for depositing his personal objects therein and a numeric key-board 10 enables the user to personally compose a secret code for instance with six figures which, through the medium of the microprocessor device contained within the technical module 3, would operate the locking of the lock of the door of the chosen locker. The numeric key-board 10 moreover comprises two keys 10*a* and 10*b* allowing to validate or enable an action and to cancel or disable an action, respectively. At last, a coin-refunding box or case 11 is provided underneath the numeric key-board 10.

The microprocessor device allowing the operation of the stowing system comprises a microprocessor 12 to which are connected an operating clock H and a watchdog WD. The microprocessor 12 is bidirectionally connected to a time base or timer 13, a memory or storage EPROM 14 containing the operating programme or software of the microprocessor 12, a memory or storage EPROM 15 in which are stored various parameters such for instance as time values of the time base for timer 13 and two random access memories or storages of the RAM type 16 and 17 allowing to store the personal codes of users upon the operating steps of depositing or lodging objects into the free lockers 2 and special secret codes used by the working owner as will be described later.

The microprocessor 12 is also connected bidirectionally to temporary storages or buffer storages 18 themselves connected bidirectionally to parallel input-output interface circuits 19 to 24, very many types of which, such as the PIA-type, are available. The interface circuit 19 is bidirectionally connected to the alphanumeric keyboards 9 and 10 whereas the interface circuit 20 is bidirectionally connected to the display device 8, to an initialization push-button 25 only accessible to the owner or maintainer to enable him to proceed with a restart in case of loss of a special secret code of the owner or maintainer when performing a particular function such as access to at least one of the occupied lockers and to a switch 26 only accessible to the owner or maintainer for the choice between a paying deposit or a deposit free of charge. The interface circuit 21 is unidirectionally connected through the agency of suitable drive or control circuits 27 to the signal lights or lamps 5*a* whereas the interface circuit 22 is unidirectionally connected through the medium of suitable drive or operating circuits 28 to the mechanisms 29 for locking and unlocking the door locks. Such mechanisms known per se may consist of electromechanical members for actuating the bolts of the locks or of motors the direction of activation of which would determine the locking or unlocking of the lock. The interface circuit 23 is bidirectionally connected through the agency of suitable drive or control circuits 30 to sensors or pick-ups 31 for detecting the proper closing of the doors of lockers upon the operating step of depositing objects and consisting for instance of opto-electronic sensors accommodated or housed either within the stile of the door in the case where the lock is integral with or rigidly connected to the door or within the door in the case where the lock would be secured to the stile, to a cancelling device 32 for the coin-operated device, i.e. for cancelling operations in the process of payment and to a coin-accepting device 33. The interface circuit 24 is bidirectionally connected through the medium of suitable drive or control circuits 34 to switches 35 for detecting any breach of the coin cash-box and of the technical module 3, to a coin-validating or enabling device 36, to an alarm hooter 37, a device 38 for shunting or shifting the coin either towards the cash box or towards the refunding box 11 according as the depositing is paying or free of charge and to a device 39 for operating a power supply for instance of 12 volts in case of electric power cut. Furthermore, the storage system according to the invention may operate from a 220 volts feed or from a low voltage feed of 12 volts serving as an emergency supply block for instance with electric batteries.

Figure 4A:
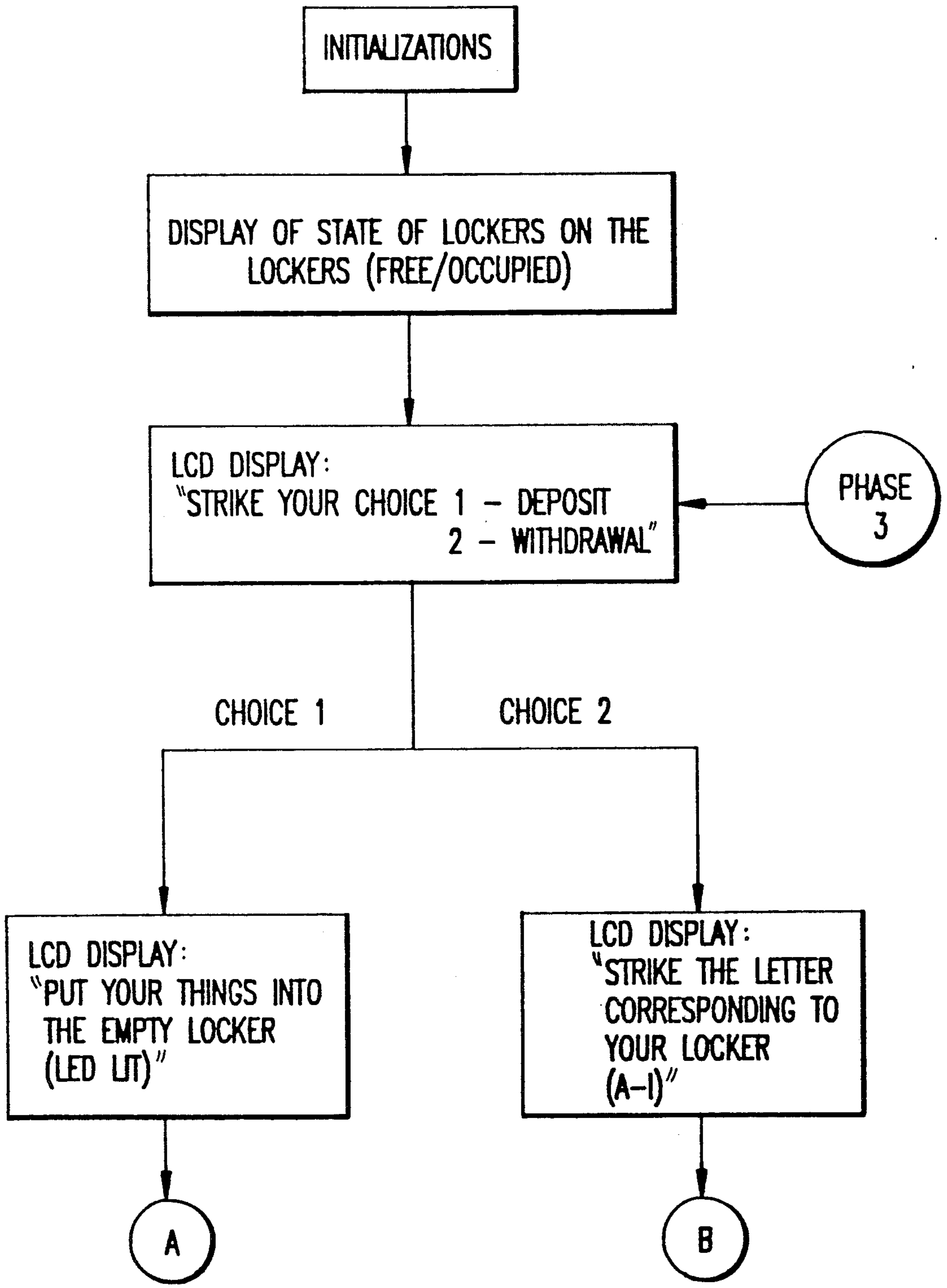
FIGS. 4A to 4I illustrate the operation algorithm of the system according to the invention.
Figure 4B:
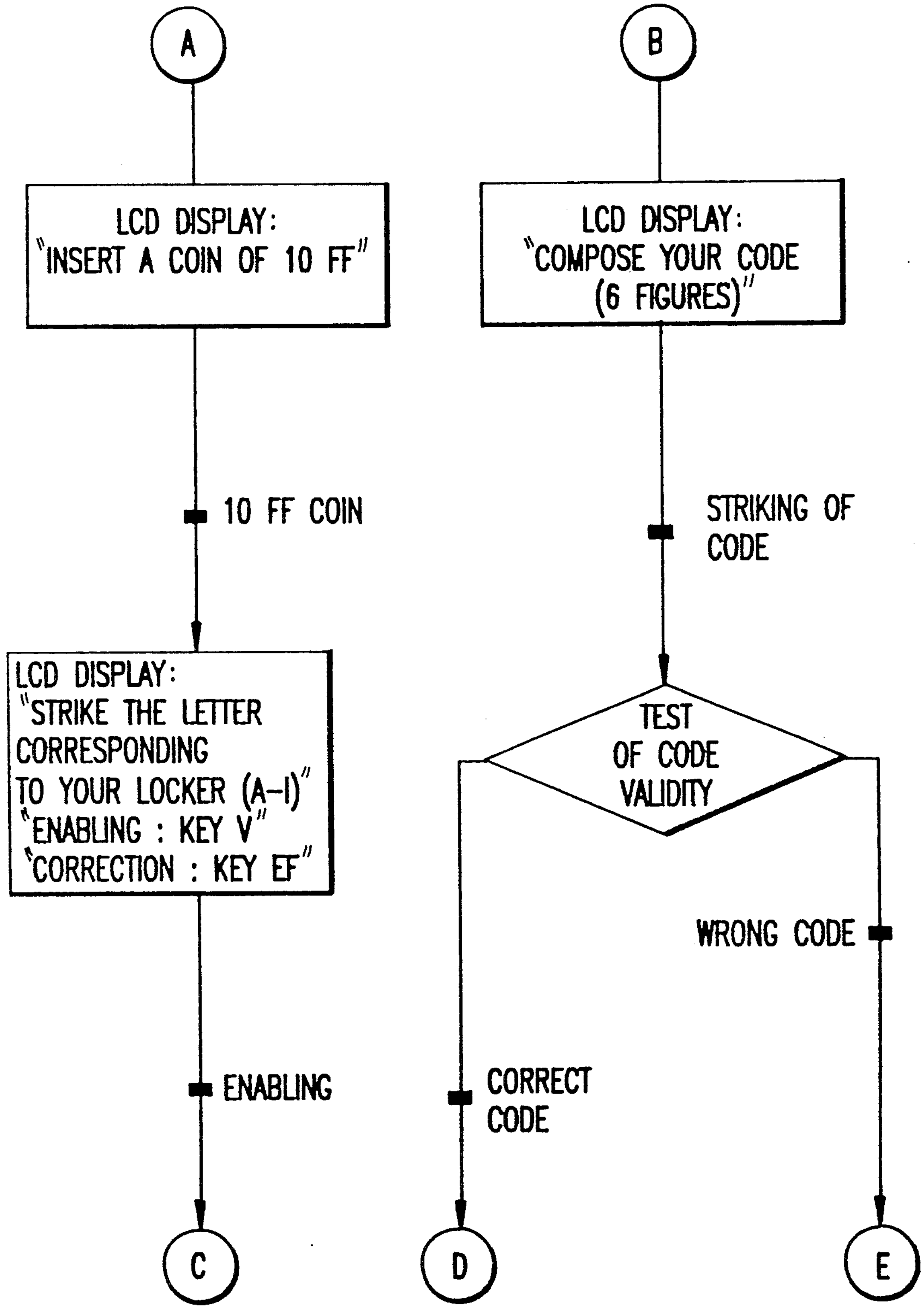
Figure 4C:
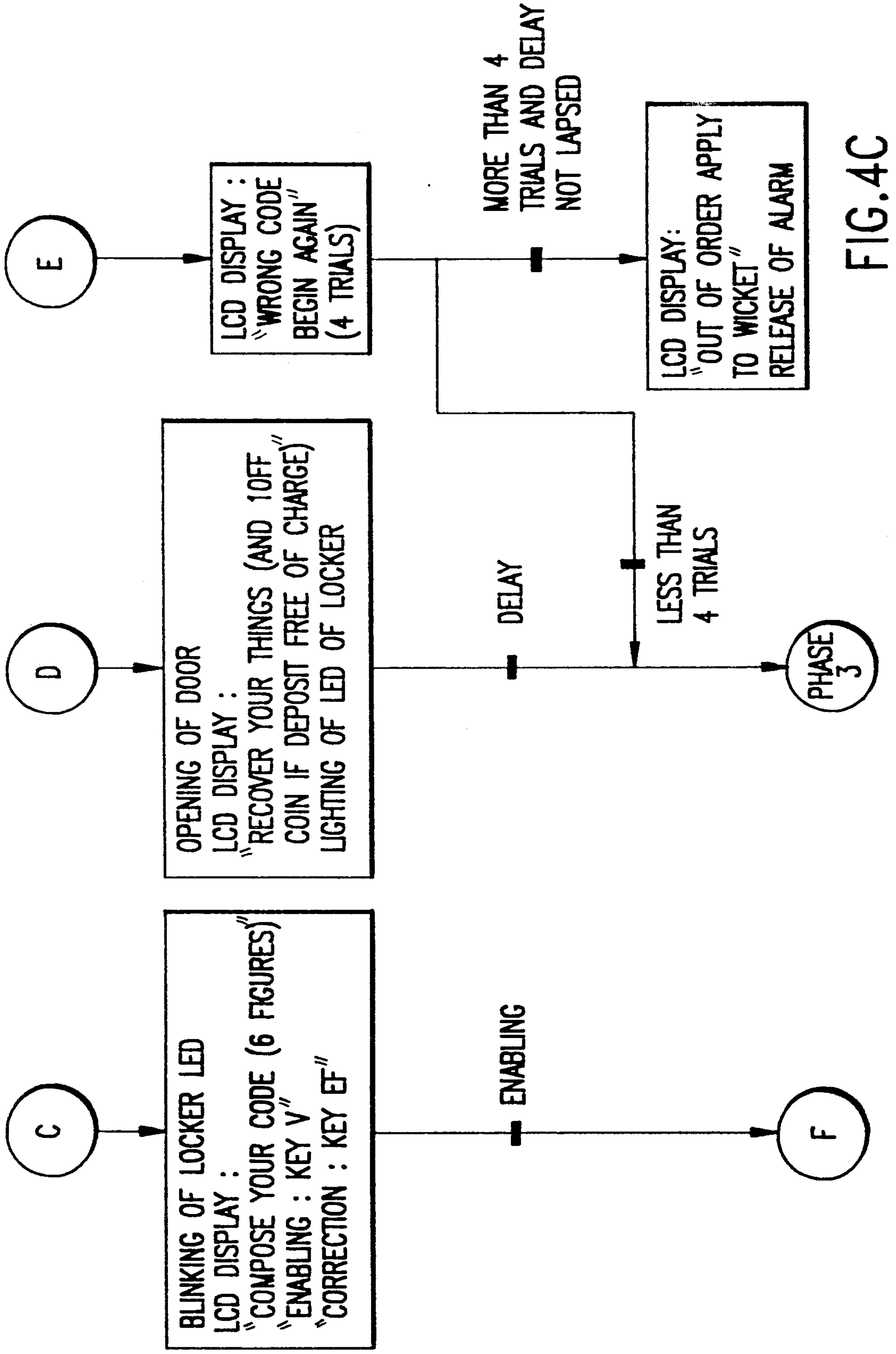
Figure 4D:
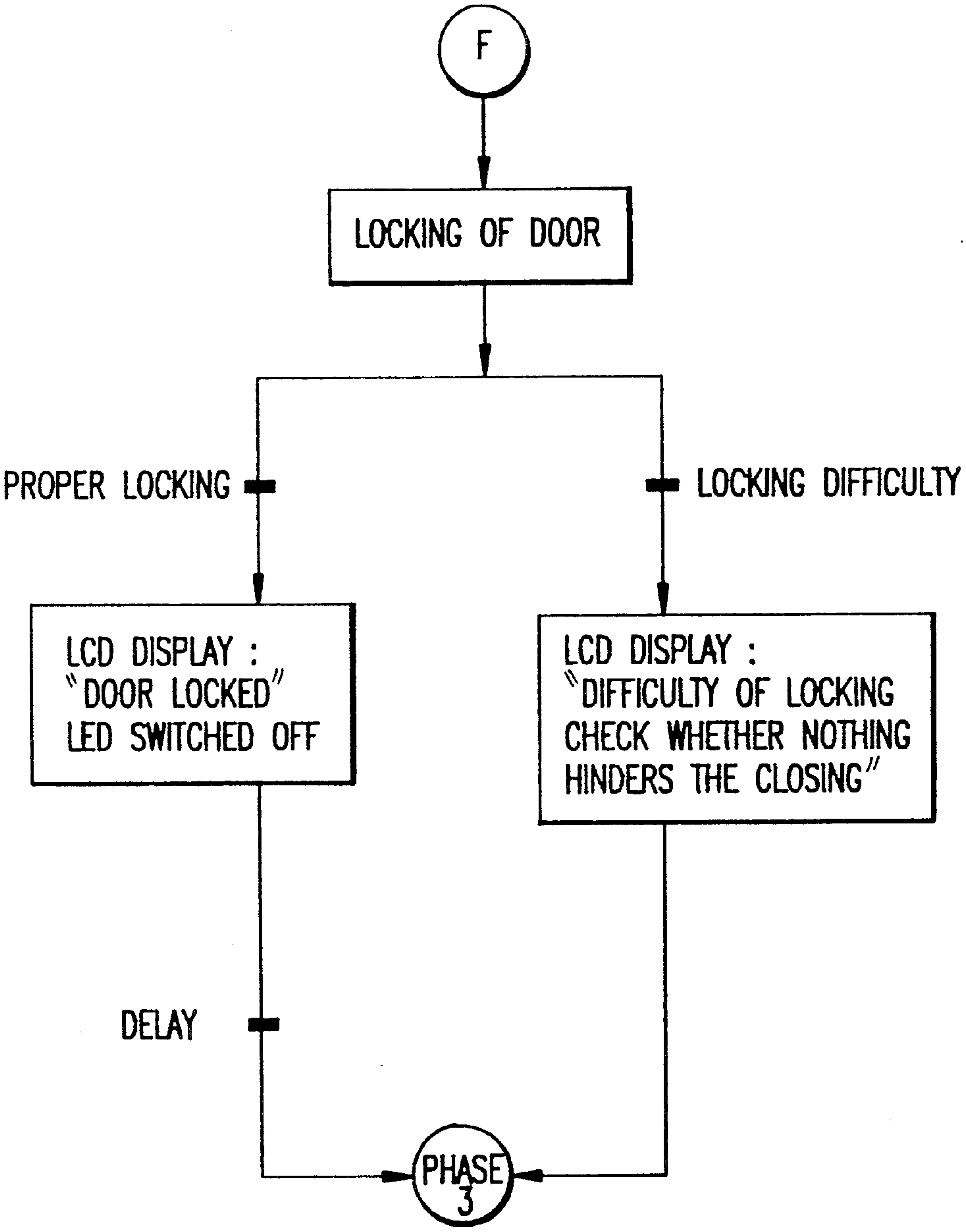
Figure 4E:
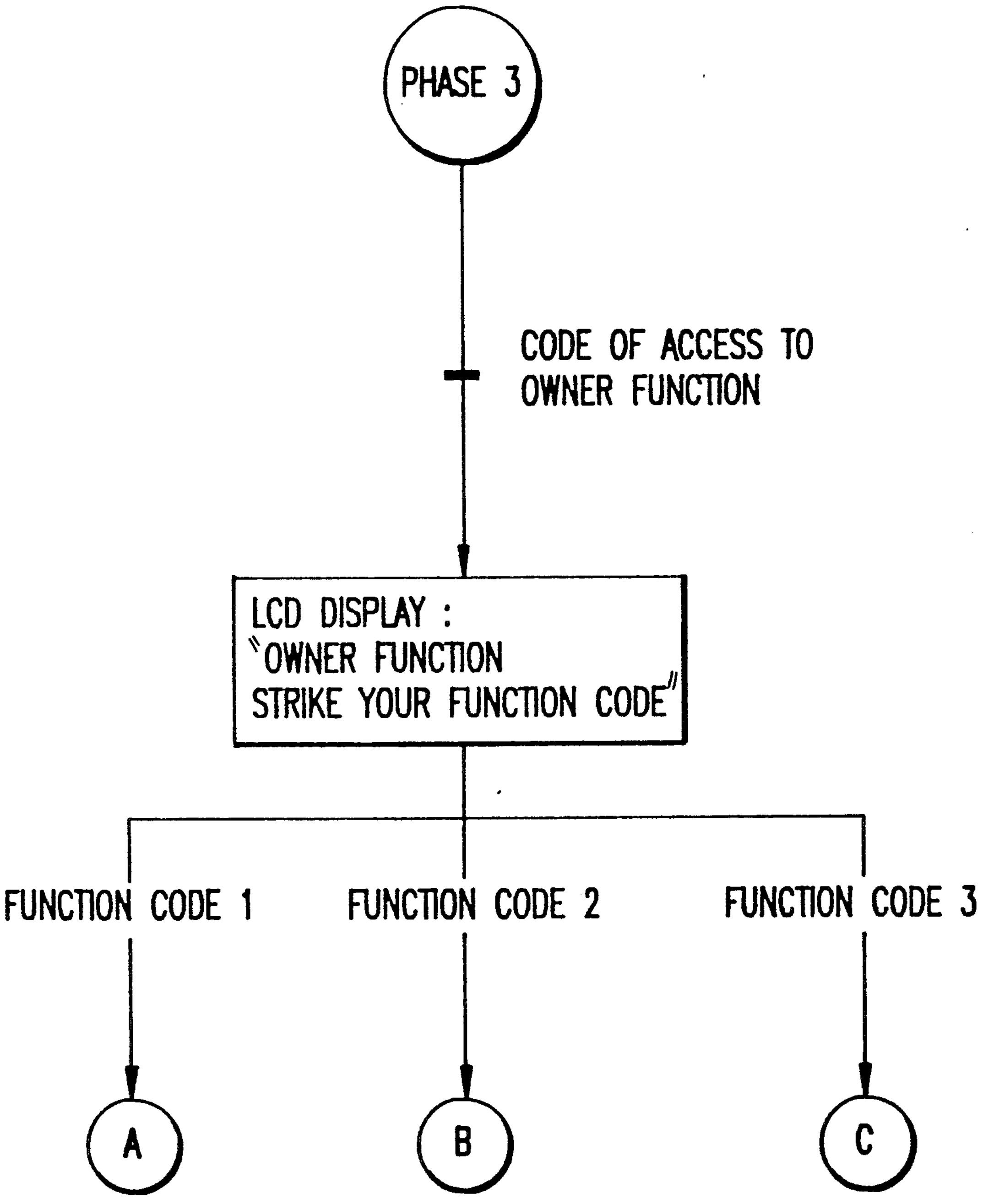
Figure 4F:
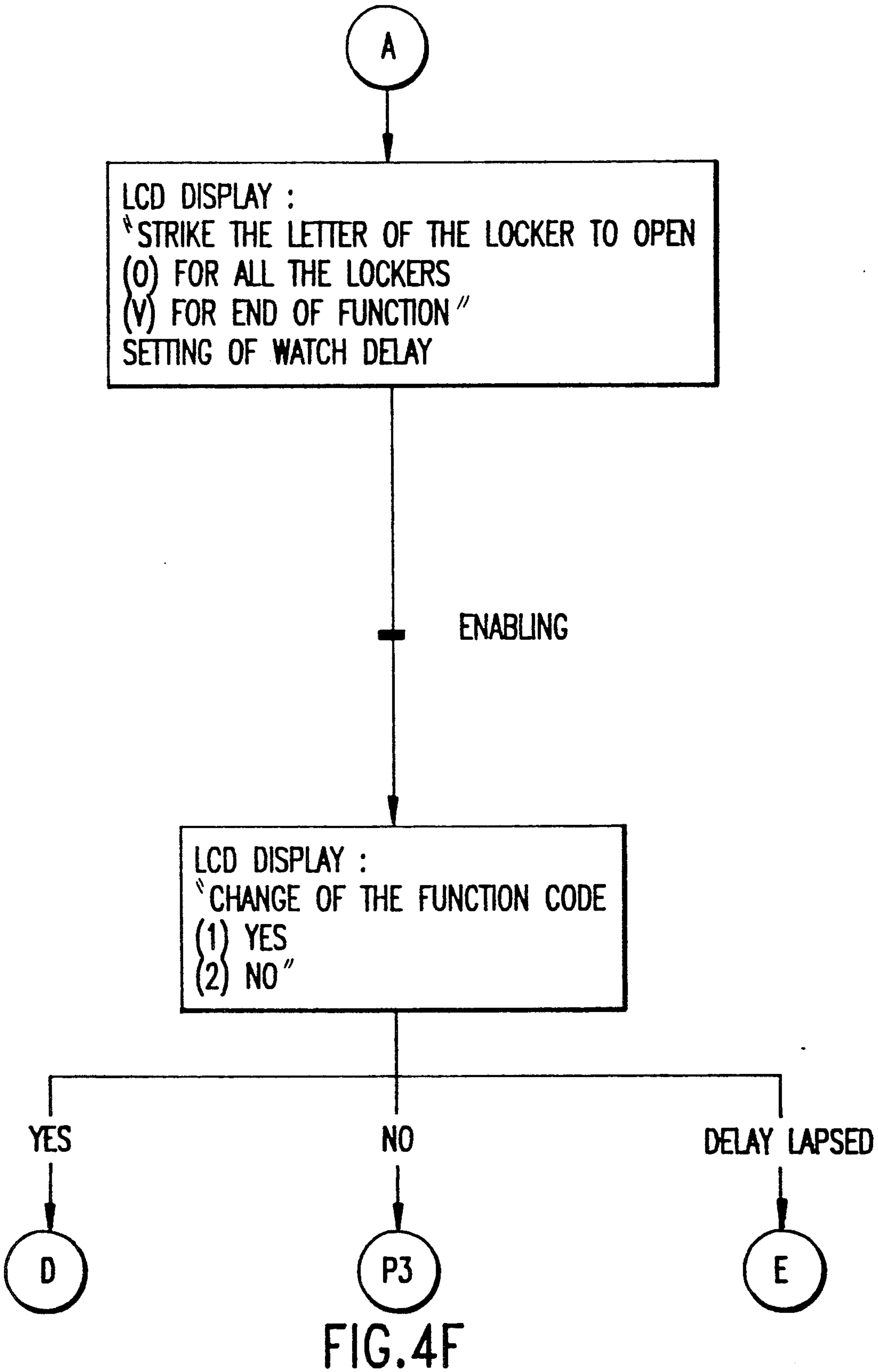
Figure 4G:
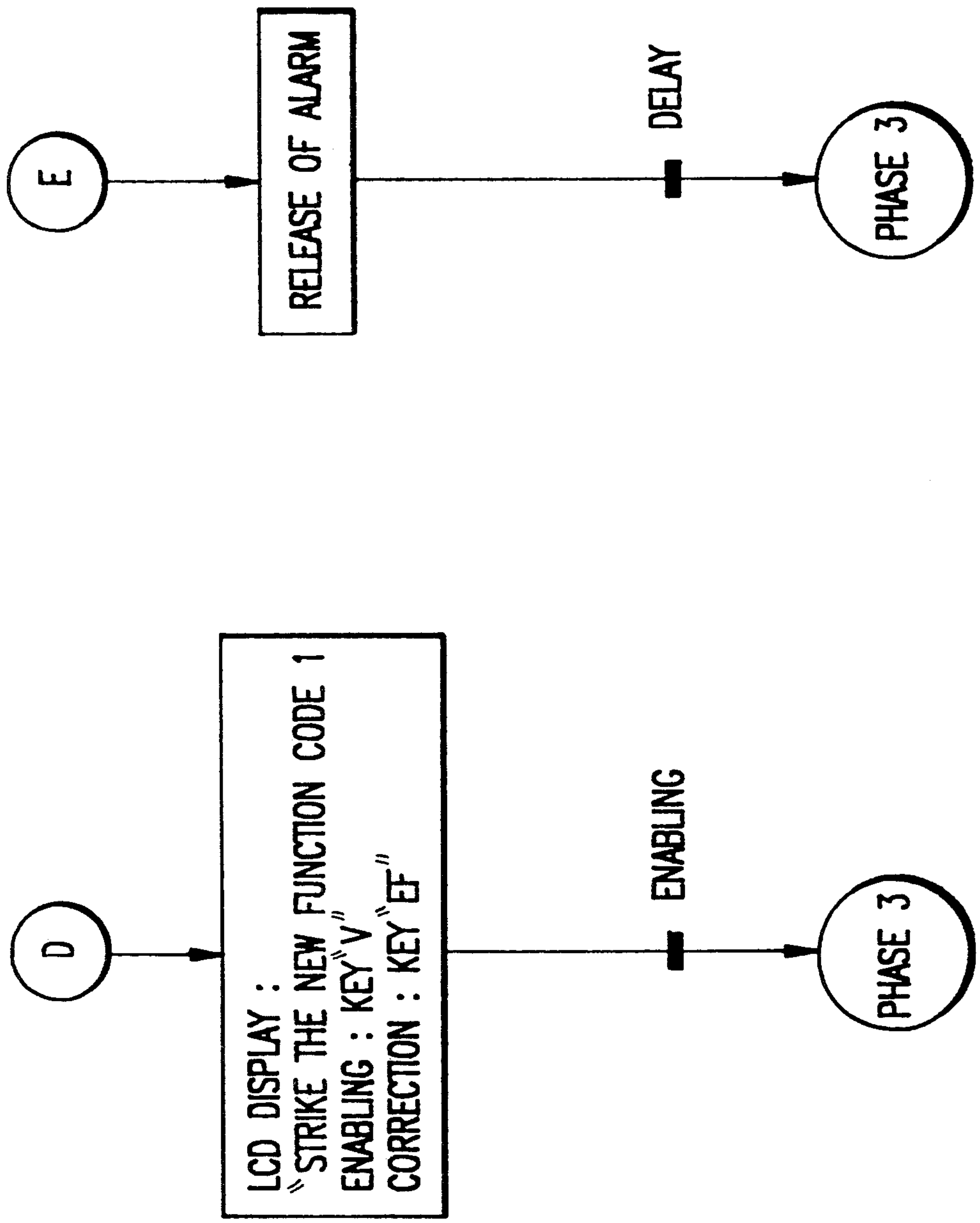
Figure 4H:
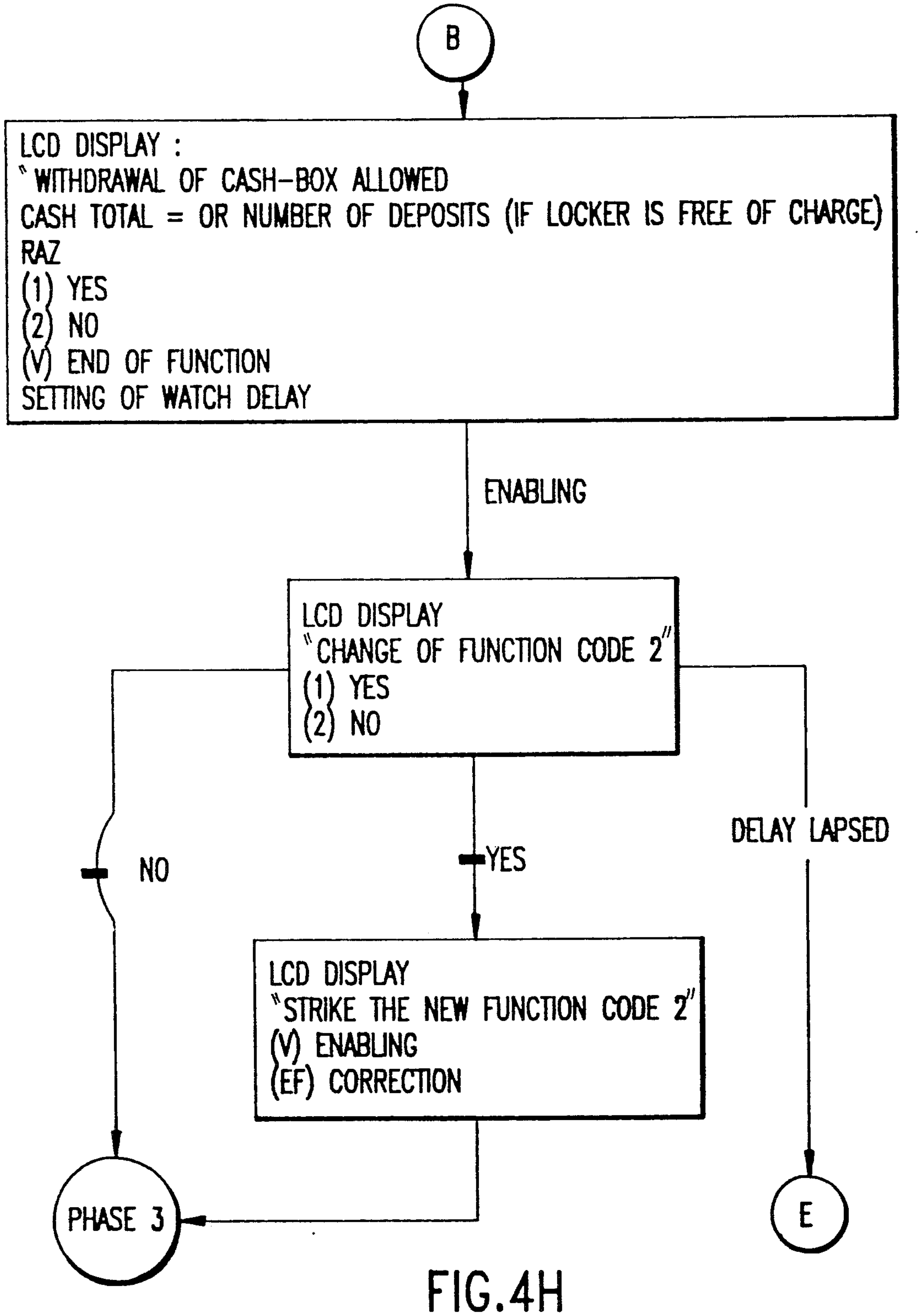
Figure 4I:
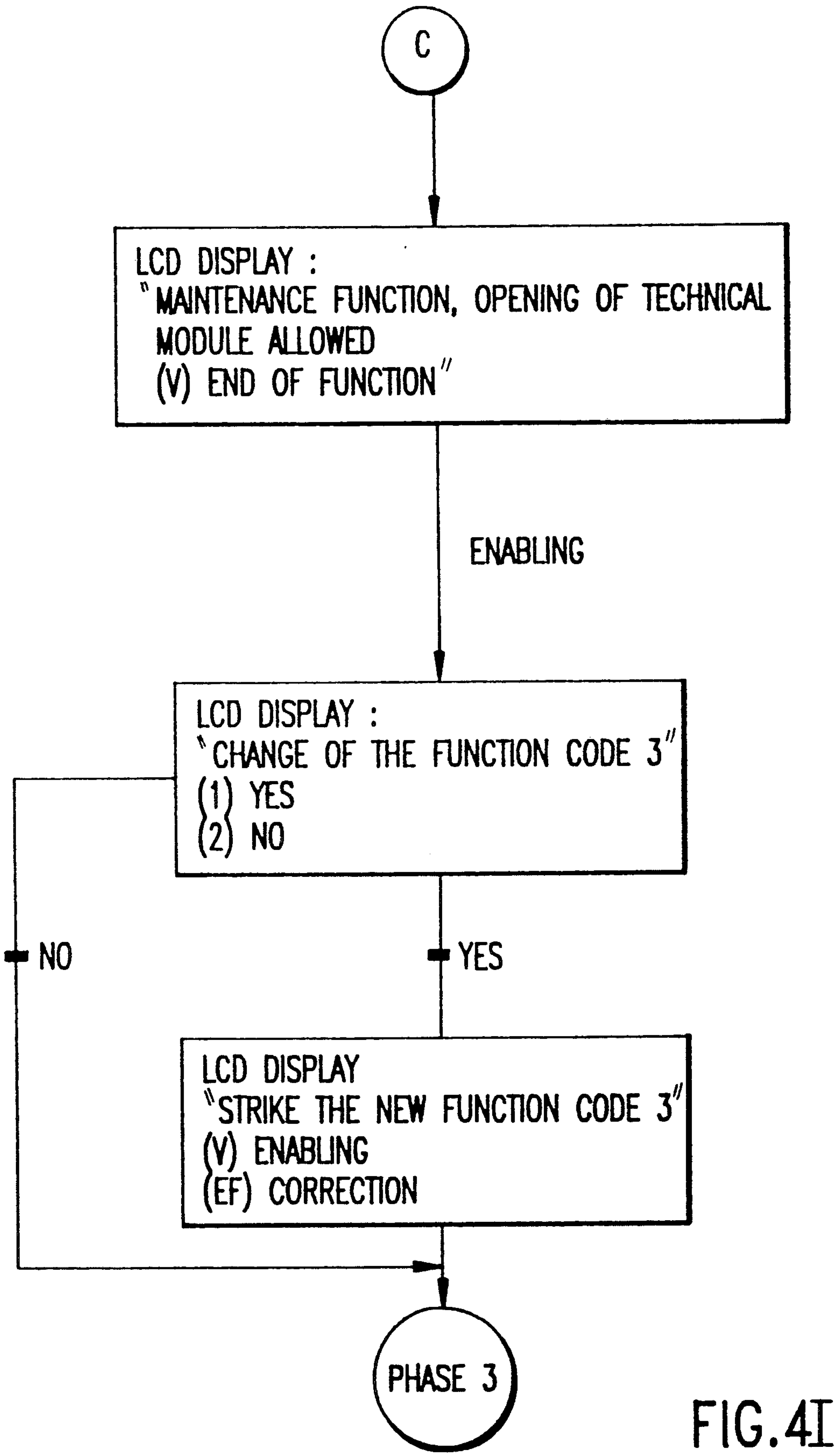

The operation of the stowing system according to the invention appears from the algorithm shown on FIGS. 4A to 4I and will be explained hereinafter in its essential functions only.

This algorithm brings out two kinds of functions namely a user function and an owner function.

The user function will be described first.

When a user presents himself in front of the stowing system 1, the board 5 would advise him about the free condition of the lockers marked or located by (for instance green) signal lamps 5*a* lit or switched on. The display device 8 indicates two operating steps which may be carried out, namely the depositing of objects into a free locker or the withdrawal of objects from an occupied locker. If the user wishes to deposit objects into a free locker, he would depress the key 1 of the key-board 10. The display device 8 then asks the user to stow or store his objects into the empty locker. Then the user would insert a coin into the slit 6. This operating step would cause the display device 8 to indicate to the user the striking onto the key-board 9 of the letter corresponding to the selected locker while moreover instructing him to validate or enable by means of the key 10*a* the selection of the locker or possibly to correct by means of the key 10*b* the letter identifying the selected locker. Once this operating step has been performed, the user would compose by means of the key-board 10 the personal secret code of six figures which is either validated or enabled by the key 10*a* or erased or cancelled by the key 10*b* to enable the user to compose another code again. The letter of the selected locker and the personal code composed by the user are transmitted to and stored in one of the random access memory storages RAM 16 and 17 of the microprocessor device which would then operate the locking of the lock of the door of the selected locker. The opto-electronic sensor associated with the lock of the door of the selected locker allows to advise the microprocessor device operates the switching off of the signal light 5*a* associated with the letter of identification of the selected locker. In the case of a difficulty of locking the lock of the door the display device 8 would instruct the user to check whether the closing of the door is hindered or prevented. Once the cause hindering the locking of the door has been removed and the door has been properly closed, the display device 8 would return to the display phase indicating the choice between a depositing operation or a withdrawal operation. The chosen locker would therefore contain the objects of the user for a determined period of occupation.

When the user withdraws his personal objects before the end of the allowed duration of occupation of the locker, he would strike at first the key (2) of the keyboard for deciding a withdrawal operating step.

Then, by means of the key-board 9, the user would strike the letter corresponding to the occupied locker and compose or enter by means of the key-board 10, the personal code he had chosen. The microprocessor device is adapted to compare the composed code to the one stored within one of the RAM storages 16, 17. After having verified the coincidence between these two codes. The microprocessor controls the unlocking of the lock of the door of the occupied locker. The display device 8 advises the user to withdraw the objects from the inside of the locker and, if the depositing is free of charge, to withdraw the coin. Once these operating steps have been performed, the microprocessor device would operate the lighting of the signal light 5*a* associated with the emptied locker. In the case where the user would have composed a mistaken or wrong code, the display device 8 advises him to compose his code again. After four unsuccessful trials for composing the code and before the lapse of a determined time delay, the microprocessor device would operate the display device 8 which advises the user of the system being out of working order and would recommend him to apply to the wicket of the official, whereas an alarm such as for instance a hooter or buzzer may be triggered by the microprocessor device. The aforesaid time delay is of course established so that the user has time enough for carrying out the withdrawal operation. In the case where the user would have given up after entering a code more than four times, the lapse of the time delay would allow the microprocessor device to operate the display device 8 for causing same to indicate the phase relating to the selection of a depositing step or of a withdrawal step.

The purpose of the owner function is to enable an official to accomplish particular functions by means of special secret codes. In the present instance, these functions are three in number: a function for opening at least one of the occupied lockers, a function for withdrawing the cash-box with display of the content thereof (or display of the number of deposits/withdrawals in the case of a use free of charge of the lockers) and a maintenance function making possible the opening of the technical module 3 without releasing or tripping the alarm. Other owner functions such as the self-test function or the self-diagnosis function of the system may of course be contemplated.

To perform each one of these functions, the official has at first to compose by means of the alphanumeric key-board 9, 10 a code for access to the owner functions. Then, he must compose the secret code specific to the chosen function. It is not necessary to describe any one of these three functions in any more detail because their roles are sufficiently explained when reading the algorithm except that it may be pointed out that the official has the possibility of changing the function code at will. Moreover, in the case where he would have forgotten this function code, the official has the possibility of having recourse to the initialization push-button 25 located inside of the fixture constituting the stowing system and which, once actuated, allows the microprocessor device to deliver to the display device 8 a general code enabling the official to perform the desired function.

The stowing system according to the invention has therefore the advantage of not delivering to any user tickets on which are printed in particular the secret codes allowing the withdrawals of objects left in the lockers thereby making savings in paper and preventing the official from having to watch the amount of paper stored and for replenishing the system with supplies of paper as often as needed.

What is claimed is:

1. A stowing system comprising:

a plurality of adjacent lockers to which are associated locks, respectively, each locker is closed by a door with the door of a free locker not locked by the corresponding lock and manually openable by a user;

a microprocessor device connected through the agency of an input/output interface device to locks of said doors to operate the locks to lock or unlock the doors of lockers, to signal lights associated with each of said lockers, respectively, said signal lights indicating a free or occupied state of the lockers, and to a coin-operated device, wherein the microprocessor device is further connected to a display device initially indicating to a user two available operations a deposit or a withdrawal of an object to or from a locker;

a key-board assembly having keys enabling the user to select one of the two assemblies operations contemplated and when a deposit operation is called for after successively having lodged one object into a selected free locker indicated by the signal light associated thereto, having shut the door thereof, having inserted the required sum into the coin-operated device and having transmitted to the microprocessor device information identifying the selected free locker through keys of the key-board assembly, enabling a composition of a personal secret code transmitted to the microprocessor device which operates the locking of the lock of the door of the selected locker; and a memory, associated with the microprocessor, storing the composed personal secret code for the whole period of occupation of the selected locker, as well as the information identifying the selected free locker.

2. A system according to claim 1, wherein in the operation of withdrawal of the object from the occupied locker, the key-board assembly further enabling the user to compose the user's personal secret code, said microprocessor device comparing said entered code with the code stored within the memory of the microprocessor device, and after having verified the coincidence between both codes, said microprocessor device operates the unlocking of the lock of the door of the occupied locker.

3. A system according to claim 1, further comprising an opto-electronic sensor associated with a lock of a door of a locker and indicating to said microprocessor device whether or not the lock is properly locked.

4. A system according to claim 1, wherein said keyboard assembly is an alphanumeric key-board and wherein said microprocessor device designates the contents of one of the digits of the personal secret code, said one of the digits identifying the chosen free locker.

5. A system according to claim 1, wherein said keyboard assembly also enables composition of special secret codes for servicing the system, the special secret codes being transmitted to the microprocessor device which permits carrying out one of the following functions: the opening of at least one locker door, the withdrawal of a cash-box with the indication of the display device of the amount of coins contained therein or the opening of a technical module in which is located the microprocessor device.

6. A system according to claim 5, wherein said microprocessor device is adapted to enable changing at least one of the special secret codes by means of said keyboard assembly.

7. A stowing system comprising:

a plurality of adjacent lockers to which are associated locks, respectively, each locker is closed by a door with the door of a free locker not locked by corresponding lock and manually openable by a user;

a microprocessor device connected, through the agency of an input/output interface device to locks of the doors, to operate the locks to lock or unlock the doors of the lockers, to signal lights associated with each of said lockers respectively, said signal lights indicating a free or occupied state of the lockers, and to a coin-operated device, wherein the microprocessor device is connected to a display device initially indicating to a user two available operations, a deposit or a withdrawal of an object to or from a locker; and a keyboard assembly having keys enabling the user to select one of the two available operations contemplated and when a deposit operation is called for after successively having lodges one object into a selected free locker indicated by the signal light associated thereto, having shut the door thereof, having inserted the required sum into the coin-operated device and having transmitted to the microprocessor device information identifying the selected free locker keys of the keyboard assembly, enabling a composition of a personal secret code fixed by the user and transmitted to the microprocessor device which operates the locking of the lock of the door of the selected locker; and a memory, associated with the microprocessor, storing the composed personal secret code for the whole period of occupation of the selected locker, as well as the information identifying the selected free locker, wherein during the operation of withdrawal of the object from the occupied locker, the key-board assembly further enabling the user to enter the user's composed personal secret code, said microprocessor device comparing said entered code with the code stored within the memory of the microprocessor device, and after having verified the coincidence between both codes, said microprocessor device unlocks the lock of the door of the occupied locker.

* * * * *

UNITED STATES PATENT AND TRADEMARK OFFICE

CERTIFICATE OF CORRECTION

PATENT NO. : 5,126,732

DATED : June 30, 1992

INVENTOR(S) : Philippe Mardon

It is certified that error appears in the above-indentified patent and that said Letters Patent is hereby corrected as shown below:

| Column | Line | |
|---|---|---|
| ABS. | 1 | Change "stowing" to --storage--. |
| 1 | 13 | Change "luggages" to --luggage--. |
| 1 | 56 | Delete "has been inserted". |
| 2 | 56 | Change "self-acting" to --self-actuating--. |
| 3 | 34 | Change "At last" to --lastly--. |
| 4 | 21 | Change "circuit 24" to --circuit 23--. |
| 5 | 5 | After "device" insert --, whether the door has been properly locked or not. If the door is properly locked, the microprocessor device--. |
| 5 | 24 | After "enter" insert --,--. |
| 5 | 2[illegible] | Change "codes. The" to --codes, the--. |
| 5 | 4 | Change "recommend" to --instruct--. |

UNITED STATES PATENT AND TRADEMARK OFFICE

CERTIFICATE OF CORRECTION

PATENT NO. : 5,126,732

DATED : June 30, 1992

INVENTOR(S) : Philippe Mardon

It is certified that error appears in the above-indentified patent and that said Letters Patent is hereby corrected as shown below:

| Column | Line | |
|---|---|---|
| 6 | 13 | Change "stowing" to --storage--. |
| 6 | 27 | Change "stowing" to --storage--. |
| 6 | 42 | After "operations" insert --,--. |
| 7 | 27 | Change "stowing" to --storage--. |
| 8 | 10 | Change "lodges" to --lodged--. |
| 8 | 16 | After "locker" insert --through--. |

Signed and Sealed this

Twenty-first Day of December, 1993

*Attest:*

Bruce Lehman

BRUCE LEHMAN

*Attesting Officer*

*Commissioner of Patents and Trademarks*